United States Patent Office 3,404,990
Patented Oct. 8, 1968

3,404,990
PREPARATION OF CLOUDING AND COLORING
AGENT FOR SOFT DRINKS
Karl Johan Stampe Villadsen, Arhus, Denmark, assignor to Aktieselskbet Grindstedvaerket, Arhus, Denmark
No Drawing. Filed Aug. 17, 1964, Ser. No. 390,239
Claims priority, application Great Britain, Aug. 26, 1963, 33,747/63
6 Claims. (Cl. 99—205)

ABSTRACT OF THE DISCLOSURE

This invention provides a new composition of matter for addition to fruit juices and to other juices and beverages such as soft drinks, lemonades, and the like, particularly to citrus fruit juices, to improve their natural cloudiness and natural color by addition of natural substances extracted from parts of the citrus fruits including citrus fruit peels and citrus fruit rags.

---

The present invention is concerned with improvements relating to the art of preparing citrus fruit juices and other juices and beverages such as for instance soft drinks, lemonades and the like. The aim of the invention is specifically to provide, as a new composition of matter, an agent for adding to juices, in particular citrus fruit juices, in order to improve their natural cloudiness and natural colour by means of natural substances derived from parts of the citrus fruit, said agent also being suitable for being added to other beverages to be consumed for refreshment, such as soft drinks, orangeades, lemonades and the like.

Recently, it has been found that the output of juice from citrus fruits can be considerably improved if, after normal pressing of the juice from the flesh of the fruit, the pulp is treated with pectolytic enzymes in order to liberate the comparatively large amounts of juice otherwise remaining in the pulp. Thereby, the economy of the processing is improved.

However, when preparing juices from citrus fruits, one is concerned not only with the liquid juice including the constituents dissolved therein. In order to obtain a satisfactory result, it is essential that the final juice is "cloudy" to a rather high degree. The cloudiness is provided by minute particles of tissue matter and cell contents, and the degree of cloudiness depends on the amount of such minute particles suspended (or colloidally dissolved) in the juice. It has been proposed to increase the degree of cloudiness by adding various substances to remain suspended in the juice. Such addition involves disadvantages, especially because it involves the addition of alien matter to the juice.

Besides the cloudiness, it is also desirable that the juice should have a colour which is intense and which resembles the natural colour of the citrus fruit from which the juice is derived. The natural juice itself, i.e. such as pressed from the fruits, has some colour, but in some cases it is desirable to intensify it by aid of colouring matter of the same composition and origin as the natural pigments etc., i.e. by aid of the natural colouring matter recovered from the fruit. Likewise, it is desirable to employ natural, genuine pigments or colouring matter as well as natural, genuine cloudifier or cloudiness-causing matter for soft drinks and similar beverages.

In the preparation of juices and soft drinks, usually only the fruit-flesh itself is utilized, though possibly also the pulp remaining after the juice has been pressed from the flesh may be used as stated above, whereas the peels, including the albedo layer, are normally discarded, except in cases where the entire fruit is processed.

The peels, however, contain a larger proportion of colouring matter and of substances capable of providing the desired cloudiness than the natural juice itself and the flesh of the fruit, i.e. the parts of the fruit inside the albedo of the peel. Thus, in normal processing of citrus fruits, one discards material containing substances which could supply the desired colouring matter and cloudiness abundantly, adding instead, in separate processing steps, such substances prepared from other sources. This is due to difficulties in the recovery, of the said substances from the waste material.

It is one of the purposes of the present invention to utilize this waste material, rich in properties desired for citrus fruit juices and other beverages such as soft drinks, to impart the said properties of stable cloudiness and improved natural colour to such juices and other beverages, such as soft drinks. According to the invention, it has been possible to overcome the difficulties formerly met with in liberating the said cloudifier and colouring matter from the peels and rags of the citrus fruits from which the juice has been pressed off in order to produce the citrus fruit juice itself.

Accordingly, the invention relates to beverages derived from citrus fruit, such as citrus fruit juices and soft-drinks having improved natural citrus fruit cloudiness and colour, in which the beverage, besides juice extracted from citrus fruit flesh, contains in suspension a small amount of cloudifying and colouring matter extracted from citrus fruit peels and/or citrus fruit rags. According to the invention, such beverages are prepared in the manner that one incorporates in the beverage a small amount of a stable suspension in water of very fine particles of natural citrus fruit cloudifier and natural citrus fruit colouring matter derived from the citrus fruit peels and/or rags.

In another aspect, the invention relates to an agent for imparting stable cloudiness and improved colour to fruit juices, especially citrus fruit juices and other beverages such as soft drinks. This agent comprises a stable suspension in water of very fine particles of natural citrus fruit cloudifier and natural citrus fruit colouring matter, derived or extracted from the peels and/or rags of citrus fruits. Hereinbefore, this agent has been described as a "suspension." However, this term is not used in the strict scientific meaning thereof; in fact, it is not fully known whether the cloudifying particles of colouring matter are present in the agent as a true suspension, since the said particles are very small and may be present as a colloidal solution in water (containing dissolved therein in true solution also other ingredients which, however, are not concerned with the present invention.) Therefore, in the present specification, the word "suspension," when pertaining to the said cloudifying and colouring particles, should be understood as comprising also colloidal solutions.

In a further aspect of the invention, it relates to a method of producing the said agent for imparting natural cloudiness and improved natural colour to citrus fruit juices, soft drinks and similar beverages. In this method the waste material from the processing of citrus fruits, for instance to obtain a citrus fruit juice therefrom, is utilized to bring about the said agent for improvement of the cloudiness and colour of citrus fruit juices and soft drinks and the like beverages, thereby avoiding the necessity of adding alien matter such as synthetic chemical compounds to the juice or other drinkable or edible product.

In this specification, the term "citrus fruit" comprises all fruits from species of the genus Citrus which are used for preparing juices and other edible or drinkable commodities, examples of which are oranges, lemons, limes and grapefruits.

According to one embodiment of the method of the present invention, the starting material is citrus fruit peels and/or rags, this material being the waste material left over after pressing off the citrus fruit juice from citrus fruits by conventional processing thereof. These peels, together with which some rags will usually be present, may or may not be boiled, particularly in order to remove bitter-tasting principles therefrom. The water used for this purpose may be discarded. Whether boiled or not, the peels and rags are subjected to a comparatively coarse comminution, after which water is added, usually in an amount from 1 to 5 parts by weight, and the peels and/or rags are boiled in this water for a suitable period of time, or at least heated to a temperature near 100° C. Thereby, the cell walls and solid constituents of the material are softened to a considerable degree and even some hydrolysis may take place. This boiling operation facilitates the liberation of the substances and minute particles responsible for the desired cloudiness and/or colour. Subsequent to the boiling operation, the boiled material is subjected to a pressing operation, whereby a liquid is liberated from the peels and/or rags, said liquid containing suspended therein (or colloidally dissolved therein) the minute particles of cloudifier and colouring matter. The liquid, however, may contain also larger particles suspended therein, such as cell and tissue debris and even whole cells and the like, and in order to remove the latter, the suspension of which is not stable in contradistinction to the stable suspension or colloidal solution of the minute particles referred to hereinbefore, the liquid pressed off from the peels and/or rags is subjected to a conventional treatment such as screening or centrifuging in order to remove the said coarser particles. Since a rather large amount of water, for instance four parts by weight, is usually employed in the boiling of the comminuted peels and/or rags, it will normally be necessary or desirable to concentrate the liquid obtained; this concentration may be carried out in any conventional manner, usually by evaporation. The degree of concentration will depend on various circumstances; if, for instance, the agent is to be employed in the same factory as the one in which it has been prepared, only a small degree of concentration is needed or in some cases none at all. If, however, the cloudifying and colouring agent is to be shipped for use elsewhere, a more concentrated suspension will be required in order to reduce transportation and container costs. A suitable degree of concentration will in many cases be from 15 to 40 percent of dry matter content. At some stage of the overall process, a sterilization may be, but, usually a pasteurization, is carried out. This may be carried out prior to or subsequent to concentration. It is preferred to perform pasteurization as the last step before filling the material into containers, because the pasteurization may cause some loss of cloudifier, and it has been found that this loss is reduced to a minimum level if pasteurization is carried out after concentration.

The liquid thus produced is usually rather viscous, owing to the fact that pectic substances are extracted into the liquid by the hot water during the boiling operation. Such a high viscosity can be avoided by adding a pectolytic enzyme to the liquid at a convenient step, prior or subsequent or both prior and subsequent to the concentration. The enzymatic treatment may conveniently be carried out at 10–55° C. for 1–24 hours. The enzymatic treatment is preferably carried out for ½–5 hours at 35–55° C. prior to the concentration step. This enzymatic treatment causes the pectic substances to be degraded, whereby the viscosity decreases. The enzymatic treatment should be concluded before pasteurization, since the latter is carried out at a temperature which destroys the enzyme.

In another embodiment of the method for preparing the agent described, the waste material from which to liberate the substances giving rise to the cloudiness and colour, i.e. citrus fruit peels and/or rags, notably the peels, is subjected to a comparatively fine comminution or subdivision, and this comparatively finely comminuted material, or an aqueous suspension thereof, i.e. of cells and cell and tissue particles from citrus fruit peel and/or rags, notably the peel, is treated with a pectolytic enzyme or pectolytic enzymes in order to liberate the cloudifier and colouring substances as very fine particles in suspension in water. Usually, some water is added to the material, either prior to or following the comminution, but normally not as much as in the embodiment described hereinbefore, and a slight heating may take place, taking care, however, that the temperature is not raised above the temperature of destroying the enzyme, which is about 55° C. This addition of water has the purpose of obtaining a convenient consistency of the material, but is not always necessary, and the amount of water added is usually small, for instance half the weight of the material to which it is added, which has the advantage that in a subsequent concentration step only comparatively little water has to be removed. In some cases it is desirable to boil or at least heat the peels to an elevated temperature in order to remove the bitter-tasting principles or part thereof from the peel. The albedo layer of the peel often has an extremely and objectionable bitter taste, which will render the product unfit for consumption. Such boiling or heating should be carried out prior to comminuting the material in order to avoid undue loss of the substances to be recovered. However, in cases where the peel is thin or is not very bitter, as for instance in some varieties of oranges, the boiling step might be omitted or the water used therefor might be employed. However, even in cases where the peel is not bitter, it may be advantageous to boil the peels in order to soften them thereby rendering them more accessible to the action of the pectolytic enzyme. In such cases, the water used for the boiling step need not be discarded. At some stage of the overall process, the material is pressed to liberate the liquid containing the cloudifier and colouring matter therefrom. Usually, this pressing stage will be performed after the treatment with the enzyme, but it is possible first to comminute the material, press the comminuted material to obtain an aqueous liquid rich in solids content, and then subject this to the treatment with the enzyme. Also, a concentration step will usually be carried out in order to obtain a suitable concentration of the desired substances. Finally, the product thus obtained will be pasteurized and poured into convenient containers. Again, this pasteurization may be carried out prior to concentration.

The product thus obtained is intended for use when increasing the cloudiness and/or intensity of colour of the juice obtained from citrus fruit by conventional processing, for instance by pressing the fruits, or for the addition to soft drinks or other beverages or products in order to inprove their colour and/or cloudiness. Such beverages need not necessarily be derived from citrus fruits. The product may also be added to a concentrate, prepared in conventional manner, for producing soft drinks, fruit juices and other beverages.

In some cases, the method may be utilized to prepare a product for direct consumption, particularly for preparing citrus fruit juice rich in cloudiness and having an intenser citrus fruit colour than normally achieved by conventional processing. In that case, the starting material need not be a waste product essentially consisting of the citrus fruit peels, but may consist of comminuted whole citrus fruits, including their entire content of flesh and natural juice, cells, cellsap etc. The comminuted whole citrus fruits are then pressed in order to obtain the citrus fruit juice therefrom, said juice having approximately the same properties as citrus fruit juice processed by conventional methods. The pulp remaining after pressing off the citrus fruit juice is then treated with pectolytic enzymes and further treated as described. Thereby it is possible to detract some of the solids from the pulp, i.e. the cloudifier and colouring matter. In any case, the material is subjected to the treatment described hereinbefore, in any of the possible sequences (to be detailed below), after which the cloudy material (suspension) extracted from the peels in the manner described is united with the citrus fruit juice obtained by pressing.

However, it is believed that the present process will have its main importance in the processing of peels of citrus fruits, which material is otherwise normally discarded, though in some cases it can be used for the preparation of pectin or as cheap animal feed, which uses do not involve substantial economic advantages.

When processing the peels of the waste material left over from the citrus fruits when they have been pressed in conventional manner, the steps involved in the second embodiment of the method of the invention may be carried out in various sequences. In a preferred embodiment, the peels and/or rags, notably the peels, are boiled in order to soften the peels and/or remove the bitter-tasting principles, and the water used for this heat treatment may be discarded. After cooling, the material is comminuted and usually a comparatively small amount of water is added in order to obtain a convenient consistency. Thereupon the enzyme is added, and the material is subjected to its action during a suitable period of time, usually from ½ to 24 hours. Thereby the substances necessary for bringing about the desired cloudiness and colour will be liberated from the tissue material. In a subsequent step, the aqueous suspension (or colloidal solution) of cloudifier and colouring matter is extracted from the remainder of the material. However, some comparatively coarse particles will often accompany the suspension, for which reason the liquid containing such comparatively coarse particles in conjunction with the desired minute ones is centrifuged or screened. Thereby a suspension is obtained which essentially only contains the minute particles responsible for the desired cloudiness and colour in suspension together with dissolved substances, which, however, present no problems. The screening or centrifuging step may be followed by a concentration step, for instance by evaporation of excess water, until the content of desired substances, i.e. suspended particles imparting the desired cloudiness and colour and dissolved matter, is suitable. Thereupon the product is sterilized and poured into bottles, cans, tanks, or the like vessels, or the sterilization is performed only after pouring the product into the desired containers.

Instead of boiling peel and rags simultaneously as just described, it will be possible to employ the following procedure: the peels are boiled and the water used therefor discarded if it has too bitter taste. The rags and the pulp are extracted with water in any convenient manner known and used in the art. The liquid extracted from the pulp, the so-called pulp-juice, may be mixed with the suspension extracted from the peels subsequent to the enzymatic treatment. The pulp-juice may thereby simultaneously be freed from undesired coarse solid pulp constituents by means of centrifuging and/or screening. Thereafter, the liquid, including the suspended particles, is concentrated, for instance by evaporation, and sterilized, for instance by pasteurization.

If the peel only contains a small amount of bitter-tasting substances, the boiling step may be omitted, or the water used therefor be used. In that case, the starting material is ground or comminuted in another convenient manner, after which, if necessary for obtaining a suitable consistency, water is added, the enzymes are added and the liquid is pressed from the material after a convenient period of enzymatic treatment, after which the liquid containing in suspension the desired cloudifier and colouring matter—if desired after centrifuging as described—is concentrated and sterilized. The enzymatic treatment may take place after boiling and cooling without discarding the cooking-water.

It is possible to combine the various embodiments in a manner so as to obtain batches of suspensions by differing methods, thereupon mixing these batches. For instance, citrus fruit rags may be enzymatically treated and thereupon pressed to obtain the juice containing the substances responsible for the cloudiness and/or colour. Simultaneously, a batch of peels may be boiled and, if necessary, the water used for boiling be discarded, and the peels subjected to enzyme treatment alone or together with juice or liquid obtained by the treatment of rags or another batch of peels with hot water, after which the batches of juice and suspensions of cloudifier and colouring substances thus prepared may be united and sterilized together. Other combinations will be obvious to those skilled in the art.

Also, other embodiments than those detailedly described will be obvious to those skilled in the art and are intended to fall within the scope of the invention.

It should be noted that normally it will be necessary to remove the ethereal oils from the outer parts of the peels; this can be done in any conventional manner and need not be described here. If the ethereal oils are not recovered as is conventionally the case, they will be lost in the boiling step. When the cloudifying and colouring suspension is extracted by pressing, a filter aid may be used, for instance kieselguhr or other material known in the art. It should also be noted that in some cases it may be desirable to subject the material twice to enzymatic treatment, for instance first to treat the comminuted material with the enzymes, and thereafter to treat the suspension with enzymes if its viscosity is higher than desired.

When using enzymes of single strength, the amount of enzyme used will usually be in the range between 0.02–2 percent based on the weight of the material to which the enzyme is added. Often an amount of enzyme less than 0.5 percent, calculated on the same basis, will be necessary. The temperature at which the enzyme treatment is carried out, usually lies in the range between 10 and 55° C., depending, for example, on the speed at which it is desired to conclude the treatment. At a rather high temperature within the interval, for instance some 35–55° C., the enzyme treatment can normally be concluded in about 1–5 hours.

Pectolytic enzymes are commercially available in various degrees of enzymatic strength and composition. The amounts of pectolytic enzyme mentioned above have reference to a commercial single strength enzymatic preparation which is marketed under the trade name Pectolase DE10.

The pectolytic strength of this preparation is such that during 3 hours at 25° C. and a pH=3.7, the viscosity of a 1.8 percent aqueous solution of citrus pectin (type A medium rapid set) is reduced in such manner that the running-off period from a pipette is reduced from 55–60 seconds to about 7 seconds, when about 4.5 g. of enzyme preparation are used per 100 g. of pectin, and a pipette is used for the viscosity-measuring having a size of about 15 ml. and a water-value of about 6 seconds.

Preparations of higher enzymatic strength may also be employed in the present process; in such cases, smaller amounts than those mentioned above can normally be used.

The following examples show particular embodiments of the process of the present invention, it being understood that the examples are only meant to illustrate the invention in a non-limitative manner.

In these examples, the enzyme preparation (Pectolase DE10) mentioned above has been employed and this will therefore not be detailed in the individual examples.

Example 1

From 100 kg. of oranges of the Valencia variety, 40 kg. of juice were first obtained by conventional methods, e.g. pressing. This juice is hereafter referred to as product A.

Furthermore, 50 kg. of peels were obtained, whereas the remainder was discarded or subjected to processing not pertinent to the present invention, for instance as described in applicant's U.S. Ser. No. 244,881.

The said 50 kg. of orange peels were boiled for 30 minutes with 50 kg. of water. The water used for boiling was discarded and 59 kg. of moist peels were obtained. The 59 kg. of moist peels were ground and mixed with 59 kg. of water, to which 590 g. of citric acid and 59 g. of pectolytic enzyme were added. This mixture had a pH-value of 3.2 and was left standing for 4 hours at 22° C., during which period the pectolytic enzyme acted on the material. At the end of the enzymatic treatment, the mixture was pressed, and thereby 96 kg. of cloudy liquid ("orange peel liquid") were obtained; this product is hereinafter referred to as product B. The said "orange peel liquid" B was subjected to centrifuging, concentration and finally sterilization by means of pasteurization. Products A and B were thereupon analyzed to determine the cloudiness and the colour.

For analysis, the products A and B were separately centrifuged and diluted with water. The absorption of the diluted juices was determined at 600 m$\mu$ and 420 m$\mu$. Absorption at 600 m$\mu$ is regarded as a measure of the cloudiness, and the difference between absorption at 420 m$\mu$ and at 600 m$\mu$ is regarded as a measure of the content of colour.

The results were as follows:

|  | Absorption at 420 m$\mu$ (a) | Absorption at 600 m$\mu$ (b) | a–b |
| --- | --- | --- | --- |
| Product A | 62 | 42 | 20 |
| Product B | 72.5 | 53.5 | 19 |

On the basis of these figures, the colour intensity may be expressed in arbitrary "colour units" (CoU), which can be calculated from the following equation:

$$CoU = d.k.(a-b)$$

where $a$ is absorption at 420 m$\mu$, $b$ absorption at 600 m$\mu$, $d$ the amount of juice and $k$ a constant equal to the degree of dilution performed prior to the absorption analysis.

Herefrom it is found that:

$$CoU_A = 40.k.20 = 800.k \text{ and}$$
$$CoU_B = 96.k. = 1824.k$$

By the preparation of the cloudy liquid or suspension, thus more than double as much colour is extracted from the fruit than is obtained from the fruit juice when processing in conventional manner.

In a similar manner, the cloudiness may be expressed in arbitrary units herein termed "cloudiness units" (ClU), which can be calculated from the following equation:

$$ClU = d.k.b$$

where $b$, $d$ and $k$ have the same meaning as hereinbefore. From this equation it is found that $$ClU_A = 40.k.42 = 1680.k, \text{ and}$$
$$ClU_B = 96.k.53.3 = 5136.k$$

which shows that the extra output of natural cloudifier is approximately thrice as high as the content of cloudifier in the juice obtained by conventional processing. Thus, cloudifier-liquid B is very suitable for the addition to an orange juice or soft drinks to improve their cloudiness as well as their colour.

Example 2

1200 kg. of orange peel are boiled for 10 minutes with 1200 kg. of water. The water used therefor is discarded. 1200 kg. of boiled peel are mixed and ground with 1200 kg. of water. The temperature is adjusted to about 35° C., after which 1.2 kg. of pectolytic enzyme is added and mixed carefuly with the mass. The enzymatic treatment is carried on for 3 hours at approximately 35° C. The enzymatically treated mixture is pressed in a press, for instance a screw press or hydraulic press, whereby 1637 kg. of cloudy liquid are obtained, which is freed from pulp by centrifuging and screening. Thereby 1365 kg. of "orange peel liquid" are obtained which may be evaporated to 95 kg. of concentrate of 30° Bx., which are subsequently pasteurized.

Example 3

1000 kg. of orange peel are boiled for 20 minutes with
1000 kg. of water. From this there is derived
1000 kg. of "boiled juice" of approximately 2.5° Bx. This juice is centrifuged and screened, whereby it is freed from pulp (hereinafter named juice A).
1000 kg. of boiled peel are cooled to 45° C. To this
500 kg. of water are added and an amount of citric acid sufficient to adjust the pH to 3.8 and
1 kg. of pectolytic enzyme. The mixture is ground in a hammer mill, subjected to the action of the enzyme at 45° C. for 2 hours and subsequently pressed in a screw press. Thereby are obtained
864 kg. of cloudy liquid, i.e. suspension of cloudifier and colouring matter, which after centrifuging and screening will yield
637 kg. of "peel liquid" (hereinafter named liquid B). The juice A and peel liquid B are combined and concentrated by evaporation, whereby they yield
148 kg. of concentrate of 30° Bx. This is sterilized. When processing the peel in this manner, it may in some cases be expedient to subject juice A to a quite brief enzymation treatment in order to avoid undesirable gelling.

Example 4

427 kg. of orange pulp plus rags are extracted with water. Thereby one obtains
180 kg. of pulp-juice of 7° Bx. (Hereinafter named juice A).
550 kg. of orange peel are boiled with
550 kg. of water for 30 minutes. The water is discarded.
510 kg. of boiled peel are ground and mixed with
0.6 kg. of pectolytic enzyme after having been cooled to 50° and adjusted to a pH-value of 3.7. The enzymation treatment is carried on for 2 hours at the said temperature of 50° C., after which
180 kg. of pulp-juice (juice A) are added, and the enzyme-treatment is continued, if desired, for half an hour. The mass is pressed, the enzyme-treated combined juice is centrifuged and screened, and
710 kg. of combined pulp juice and peel-suspension containing cloudifier are obtained; this is concentrated by evaporation to
86 kg. of concentrate of 30° Bx., which are subsequently pasteurized. It is possible to pasteurize juice A at once after its preparation and thereupon use it as described. It is also possible to add the juice A to the peel-liquid (cloudifier and colouring matter suspension) after the latter has been pressed from the enzyme-treated peels, after which the two liquids are centrifuged, screened and concentrated together.

Example 5

1000 kg. of orange peel, rags and pulp are ground and boiled with
3000 kg. of water for 15 minutes. The mixture is pressed in a screw press, and the liquid thereby obtained is centrifuged and screened in order to free it from pulp. Thereby
2400 kg. of juice or liquid are obtained which are treated with
0.5 kg. of pectolytic enzyme at 40° C. for so long time that the viscosity is reduced by approximately 5 percent. Thereupon the liquid is concentrated by evaporation, by which
181 kg. of concentrate of 30° Bx. are obtained. This is pasteurized. It may be expedient or necessary to carry out the evaporation in two steps with an intermediary enzymation treatment. In some cases, this enzymation step may be sufficient, thus rendering the enzymation treatment prior to concentration superfluous.

The agent may be mixed with beverages prepared in a normal manner, for instance citrus fruit juices or concentrates obtained by conventional processing of citrus fruits, or soft drinks or concentrates therefor in any desired proportion, the agent being added either alone or together with other additives. A 30° Bx. concentrated agent as described will in cloudifying and colouring power be equivalent to about the ten-fold amount of citrus fruit juice prepared by conventional processing.

The amount of the agent to be added to a conventional citrus fruit juice or other beverage such as a soft drink will depend on the dry-matter content of the agent and the desired degree of cloudiness, and further on the constituents and the inherent cloudiness and colour of the beverage to which it is added.

What I claim is:

1. In a method for preparing an agent in the form of a very fine suspension for imparting stable natural citrus fruit cloudiness and color to fruit juices and soft drinks, in which method an aqueous liquid is extracted by mechanical means from material selected from the group consisting of citrus fruit peels and citrus fruit rags and the liquid thus extracted is subjected to a heat treatment and a concentration treatment the improvement which comprises treating with hot water having a temperature at least near the boiling point material selected from the group consisting of citrus fruit peels and citrus rags, in a comminuted condition, mechanically extracting said comminuted material, removing coarser particles of cell and tissue debris from the extract, concentrating and pasteurizing the extract so as to recover a very fine suspension of natural citrus fruit cloudifier and coloring matter, the pasteurization being carried out at any desired stage after the mechanical extraction.

2. A method as claimed in claim 1 wherein the comminuted material is boiled in 1 to 5 parts by weight of water.

3. A method as claimed in claim 1 wherein prior to extraction the material is boiled to remove bitter tasting principles.

4. A method as claimed in claim 1, wherein the liquid is treated after the mechanical treatment with a pectolytic enzyme to reduce its viscosity.

5. A method as claimed in claim 4, wherein the enzyme treatment is carried out at a temperature of 10–55° C. for ½–24 hours prior to the concentration step.

6. A method as claimed in claim 5, wherein the enzyme treatment is carried out at 35–55° C. for ½–5 hours.

References Cited

UNITED STATES PATENTS

| | | | |
|---|---|---|---|
| 1,479,329 | 1/1924 | Snelling | 99—28 |
| 1,848,760 | 3/1932 | Willison | 99—105 |
| 2,530,322 | 11/1950 | Ash | 99—100 |
| 3,037,975 | 6/1962 | Cohn | 99—105 |

MAURICE W. GREENSTEIN, *Primary Examiner.*